US007126810B1

(12) United States Patent  
Mueller et al.

(10) Patent No.: US 7,126,810 B1  
(45) Date of Patent: Oct. 24, 2006

(54) CRYOGENIC CAPACITORS

(76) Inventors: Otward M. Mueller, 96 Sweet Rd., Ballston Lake, NY (US) 12019; Eduard K. Mueller, 20 McCormicks La., Ballston Lake, NY (US) 12019; Michael J. Hennessy, 9 Patroon Pl., Ballston Lake, NY (US) 12019

( * ) Notice: Subject to any disclaimer, the term of this patent is extended or adjusted under 35 U.S.C. 154(b) by 29 days.

(21) Appl. No.: 10/875,458

(22) Filed: Jun. 24, 2004

Related U.S. Application Data

(60) Provisional application No. 60/482,064, filed on Jun. 24, 2003.

(51) Int. Cl.  
*H01G 4/38* (2006.01)

(52) U.S. Cl. .............. 361/328; 361/301.4; 361/321.4; 361/308.1; 361/227; 361/311

(58) Field of Classification Search ............ 361/301.4, 361/301.3, 301, 303–305, 328, 321.1, 321.2, 361/321.4, 308.1, 311  
See application file for complete search history.

(56) References Cited

U.S. PATENT DOCUMENTS

| | | | | |
|---|---|---|---|---|
| 3,720,598 A | * | 3/1973 | Thompson | ............. 422/186.22 |
| 4,082,991 A | * | 4/1978 | Constant | ..................... 320/166 |
| 4,599,677 A | * | 7/1986 | Lawless et al. | .......... 361/321.2 |
| 5,606,870 A | * | 3/1997 | Lester | ........................ 62/434 |
| 5,623,724 A | * | 4/1997 | Gurkovich et al. | ............ 419/8 |
| 5,898,561 A | * | 4/1999 | Mandelcorn et al. | .... 361/301.4 |
| 6,411,491 B1 | * | 6/2002 | Lawless et al. | .......... 361/301.4 |

* cited by examiner

*Primary Examiner*—Nguyen T Ha  
(74) *Attorney, Agent, or Firm*—Leonard Cooper

(57) ABSTRACT

This invention describes a means by which performance characteristics of capacitors can be improved. This is achieved by reducing the temperature, preferably but not exclusively to cryogenic temperatures below 100 K. This is based on the observation that the dielectric strength, dielectric losses and plate losses in many capacitors, such as film capacitors, improve as the temperature is decreased. A cryogenic capacitor bank is also described, which exhibits energy densities up to four times those of conventional, room-temperature capacitor banks. Cryogenic capacitors can be combined with cryogenically operated semiconductors or with superconductors in such a way as to reduce the size, weight, and losses of a complete system.

18 Claims, 8 Drawing Sheets

(4 of 8 Drawing Sheet(s) Filed in Color)

Table    Loss-factor tanδ at 6-10Hz

| Polymer | tanδ×10⁻³ | | | |
|---|---|---|---|---|
| | 4.2K | 77K | 150K | 293K |
| amorphous | | | | |
| PEA[1] | 7.0 | 14.0 | 20 | >200 |
| PMA[1] | 5.0 | 6.0 | 20 | >200 |
| PS | 2.0 | 4.5 | 4 | 10 |
| PSU | 2.0 | 6.0 | 20 | 4 |
| PEC | 2.0 | 8.0 | 50 | 3 |
| PEMA | 2.0 | 9.0 | 10 | 120 |
| PBMA | 0.2 | 4.4 | 2 | 2 |
| PC | 1.2 | 6.0 | 26 | 8 |
| PVC | 1.0 | 6.0 | 12 | 13 |
| PEEK | 1.0 | 4.0 | 7 | 5 |
| PMMA | 0.6 | 2.0 | 7 | 90 |
| PEI | 1.6 | 2.4 | 4 | 12 |
| PAI | 1.3 | 3.0 | 7 | 12 |
| PI (Vespel) | 1.1 | 5.2 | 7 | 11 |
| cross-linked | | | | |
| PI (Kerimid) | 1.4 | 3.5 | 9 | 15 |
| EP[2] | 1.0 | 4.0 | 16 to 30 | 10 to 65 |
| semicrystalline | | | | |
| ETFE | 1.0 | 7.0 | 50 | 12 |
| PTFE | 0.8 | 1.7 | 35 | 80 |
| FEP | 0.6 | 3.0 | 40 | 12 |
| PVDF | 0.6 | 3.3 | 15 | 22 |
| PA 11 | 0.5 | 2.0 | 50 | 11 |
| PBTP | 0.3 | 7.0 | 35 | 4 |
| PA 6.10 | 0.5 | 13.0 | 33 | 7 |
| LDPE | 0.5 | 10.0 | 52 | 65 |
| PFA | 0.5 | 2.7 | 50 | 15 |
| HDPE | 0.3 | 5.0 | 54 | 26 |
| POM | 0.3 | 1.0 | 16 | 8 |
| PP | 1.2 | 2.0 | 10 | 60 |

Nomenclature of special polymers or copolymers:

| | | | |
|---|---|---|---|
| PEA | : Polyethylacrylate | ETFE | : copolymer PE / PTFE |
| PMA | : Polymethylacrylate | FEP | : copolymer PTFE / hexafluorpropylene |
| PEC | : postchlorided PE | PVDF | : Polyvinyl fluoride |
| PEMA | : Polyethyl methacrylate | PBTP | : Polybutylene terephthalate |
| PBMA | : Polybutyl methacrylate | PFA | : copolymer perfluoralkoxy |

1) Very soft polymer; not applicable as structural material.
2) Epoxy resins with different chemical compositions and different cross-link densities.

Fig. 4

CRYOGENIC CAPACITORS

This patent claims benefit of provisional patent application Ser. 60/482,064 filed on Jun. 24, 2003.

BACKGROUND OF THE INVENTION

The term "film capacitors" relates to a family of capacitors which are wound, wrapped or molded with films comprising of metals deposited or laminated on thin insulating materials, usually polymer films such as polypropylene. It is well known that the dielectric strength of many insulating films used in film capacitors rises as the temperature is reduced. FIG. 1 shows data for various films, although the group of films represented in these figures is not exhaustive. Many other film materials with similar temperature behavior are also used in capacitors.

What is not well documented is the fact that a capacitor wrapped with these films exhibits improved performance at cryogenic temperatures. First and foremost, the voltage capability increases as the device is cooled. This leads to much higher energy storage in cryogenically operated capacitors, since the stored energy is proportional to the square of the operating voltage:

$$E = \tfrac{1}{2} CV^2.$$

The inventors have operated conventional, off-the-shelf film capacitors (manufactured and rated for use around room temperature) at more than twice their rated voltages. The energy storage capability in these devices therefore increased by a factor of four compared to room-temperature operation. This phenomenon is demonstrated in FIG. 2, which shows a dramatic reduction in the leakage current of a cryogenically operated capacitor. Increasing leakage current with increasing voltage is a direct indicator that the device is nearing its breakdown limit.

The equivalent series resistance (ESR) of these capacitors is also reduced at low temperatures as shown by our measurements in FIG. 3. The results are normalized with respect to 300-K operation. This improvement may be a result of the increased conductivity in the plate and terminal materials or reduction of dielectric losses or both. Capacitor plate and terminal materials with conductivities that are enhanced by low temperatures (including superconductors) will further improve the ESR. Dielectric materials whose losses decrease at low temperatures can also experience a resultant improvement in ESR. FIG. 4 gives the loss tangents of various films at several temperatures, and illustrates the improvement at cryogenic temperatures, especially at 77 K (liquid nitrogen) and at 4.2 K (liquid helium). Note the improvement of the loss factor for polypropylene (PP), which decreases by a factor of 30 when cooled from room temperature to 77 K. Most film capacitors are made with PP.

It is important to note that the low-temperature behavior of an intrinsic dielectric material does not always translate into the same behavior for a manufactured device. The metallization process, for example, can greatly degrade the dielectric strength of polymer films, and thus the final capacitor can have a much lower breakdown voltage than one would expect. Cryogenic operation of capacitors can help offset this deterioration.

SUMMARY OF THE INVENTION

This invention proposes the use of capacitors, including, but not limited to, polymer film capacitors, at cryogenic temperatures for improved performance. Cryogenic operation of off-the-shelf capacitors often leads to higher breakdown voltage because of improvements in the dielectric strength of many polymer films at these temperatures.

The increase in capacitor voltage breakdown is also related to the cryogenic environment, which is usually hermetically sealed and consequently dry. The environment is typically a vacuum or a cryogenic liquid or gas. The presence of a cryogenic fluid, especially liquid nitrogen, can prevent arcing around the capacitor leads, as well as voltage creep. Cooling also reduces the leakage current in the capacitor.

The device's equivalent series resistance, or ESR, is also improved through cryogenic operation. This improvement may be a result of the increased conductivity in the plate and terminal materials or reduction of dielectric losses or both. Capacitor plate and terminal materials with conductivities that are enhanced by low temperatures (including superconductors) will further improve the ESR. Cryogenic operation allows these materials, especially superconducting thin-films, to be utilized to great advantage in energy storage or even filtering applications.

For high-temperature applications, cryogenic capacitors can be housed in a container consisting of a high-temperature outer heat shield surrounding a conventional cryogenic Dewar. Utilizing such a container, devices could operated as high as 200° C. or even higher.

EXAMPLE

An example of utilizing cryogenic film capacitors with improved energy density is given using an off-the-shelf device (MTECH part number CAP-09), rated 290 μF and 750 V at 300 K (room temperature). Consider a 100-mF, 1500 V capacitor bank. At 300 K, one needs first to series-connect the capacitors in pairs to reach 1500 V, and then to parallel several of these pairs to reach 100 mF, or 100,000 μF. The capacitance of each series pair is one-half that of an individual capacitor, or 145 μF. In order to reach 100 mF (100,000 μF), one needs to parallel 690 pairs of capacitors, requiring a total of 1380 devices. The dimension of each cylindrical capacitor is as follows:

Diameter: About 8.0 cm
Radius: About 4.0 cm
Area: 50.27 cm$^2$
Height: 16.5 cm (including terminals)
Volume: 830 cm$^3$ per capacitor The packing fraction of a group of circles in a hexagonal format is 87%. Thus, to package 1380 capacitors would require the following volume: (1380 caps.)×(830 cm$^3$ per cap.)/(0.87 packing fraction)=1,316,552 cm$^3$, or a total volume of 1.32 m$^3$.

At 77 K, these same capacitors can be safely operated at 1500 V at a temperature of 77 K because of the increased voltage breakdown. Thus, there is no need to series-connect any capacitors. Since the capacitance remains about the same at 77 K as it was at 300 K, one no longer needs to series-connect devices, and the total number of capacitors required is only 100,000 μF/290 μF per capacitor=345 capacitors. This is only one-fourth the number of capacitors required at room temperature, and so the volume of the capacitor bank is reduced by a factor of four. To package these 345 capacitors in a hexagonal format would take up a volume of (345 caps.)×(830 cm$^3$ per cap.)/(0.87 packing fraction)=329,138 cm$^3$, or only 0.33 m$^3$. FIG. 5 shows the current state of the art for capacitive energy storage banks. FIG. 6 illustrates the invention, showing the cryogenic capacitors housed inside a cryogenic container, or Dewar.

Finally, FIG. 7 shows an artist's rendition of a cryogenic capacitor bank next to a conventional, room-temperature bank, demonstrating the reduction in volume that can be achieved by operating the capacitors at low temperatures.

An alternative to reducing the volume and achieving the same total energy storage is to keep the volume of the capacitor bank constant, and to take advantage of the improved energy density to store four times the energy in the same amount of space. Of course, in both of these instances, cryogenic hardware such as a liquid nitrogen Dewar or a refrigerator must be added, so the true space savings are reduced somewhat. Nevertheless, large and bulky heat removal hardware required for high-temperature operation can be removed. In addition, smaller power buses are required since the conductivity of copper and similar metals also improves with reduced temperature. Perhaps most importantly, superconductors can be utilized to carry current to and from the capacitors, thus greatly enhancing the size and transmission efficiency of the overall system.

Finally, cryogenic capacitors can also be integrated into larger cryogenic power electronic systems, which offer their own improvements in the size, weight, and performance. This is especially true for larger systems, where a great number of devices and superconducting cables need to be cooled, since large refrigeration systems tend to be more efficient than small ones. Moreover, larger refrigeration systems take up relatively less space and weight on a percentage basis. Consequently, by integrating cryogenic capacitor banks with major cryogenic subsystems such as superconducting motors, cryogenic inverters, converters, rectifiers, and inductors, even more economy of scale can be offered with respect to the refrigerator system, together with an associated net gain of system performance.

Types of Capacitors Claimed

The inventors have cryogenically tested a number of capacitors constructed with various dielectric materials but intended by the manufacturer for room-temperature operation. Each capacitor was submerged in liquid nitrogen and electrically tested. In one such capacitor (MTECH part number CAP-08), rated 5000 WVDC and 100 nF at room temperature, we measured more than 14 times improvement in the sources of electrical loss, the dissipation factor (D) and equivalent series resistance (RS). At 300 K, $D=0.00175\pm0.00003$. At 77 K, this decreased to $0.00012\pm0.00001$. The series resistance decreased from $2.725\pm0.035\ \Omega$ at 300 K to $0.185\pm0.015\ \Omega$ at 77 K, and the quality factor Q increased from $571.9\pm7.8$ at 300 K to $8650.6\pm739.1$ at 77 K (all measurements were made at 1 kHz). Meanwhile, the capacitance barely changed, decreasing from $102.13\pm0.01$ nF at 300 K to $100.95\pm0.01$ nF at 77 K. Similar behavior was observed for a number of capacitors of made with various dielectrics.

Any capacitor whose dielectric material demonstrates any kind of improvement through cryogenic cooling is understood to fall within the scope of this patent. Therefore, this invention includes cryogenic capacitors made of polymer films such as polypropylene, polystyrene, and so on. Other candidates include tantalum capacitors, newly-developed solid polymer aluminum (SPA) capacitors, and sapphire capacitors. The complete list is too lengthy to include herein.

Finally, capacitors for filtering, RF, and microwave applications are also envisioned.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 shows the loss-factor, tan δ, of several dielectric materials at various temperatures [2], especially at 77 K (liquid nitrogen) and 4.2 K (liquid helium).

DESCRIPTION OF THE PREFERRED EMBODIMENTS

Figure 1:
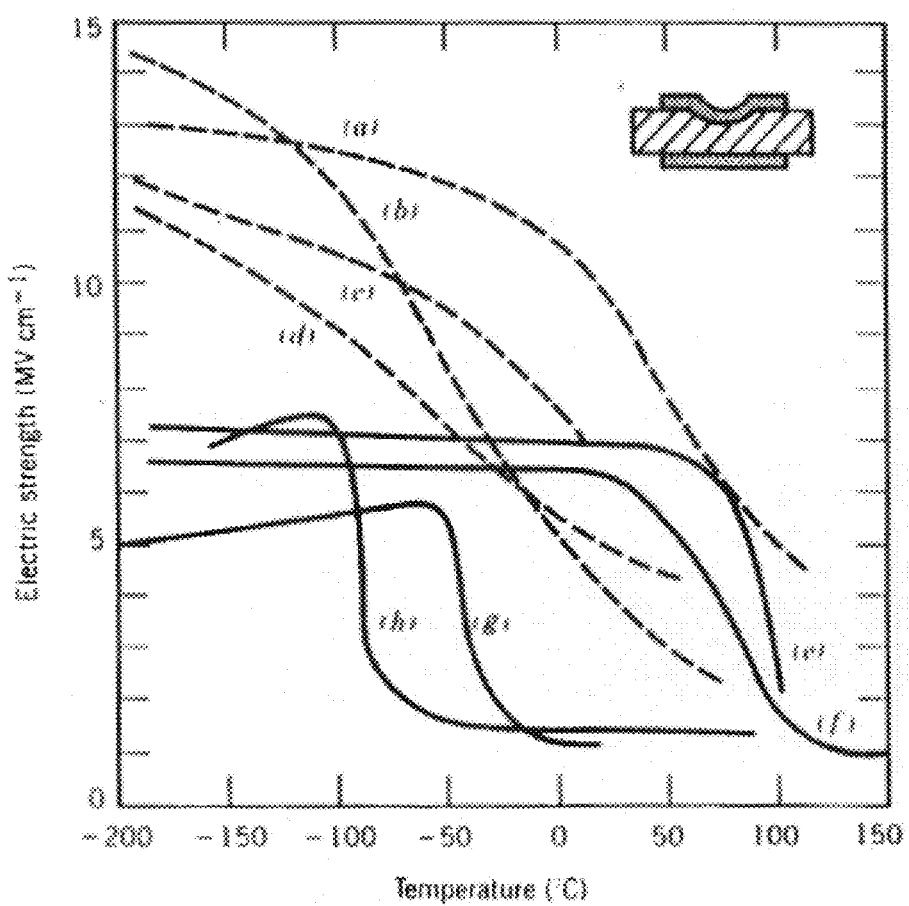
FIG. 1 gives examples of the temperature dependence of the DC electric strength of a range of polar (broken lines) and nonpolar (solid lines) polymers: (a) polymethylmethacrylate, (b) polyvinyl alcohol, (c) polyvinyl chloride acetate, (d) 55% chlorinated polyethylene, (e) atactic polystyrene, (f) low density polyethylene, (g) polyisobutylene, and (b) polybutadiene [1].
Figure 2:
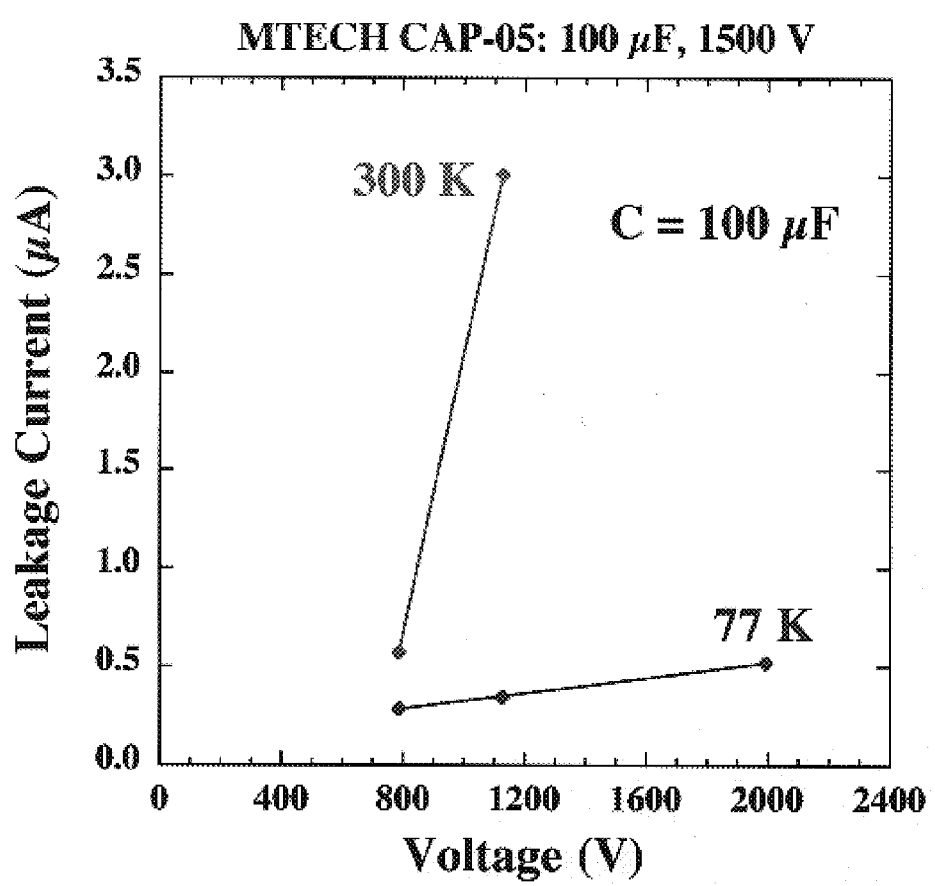
FIG. 2 shows the reduction in leakage current of an MTECH capacitor at 77 K compared to 300 K, which implies the improvement in breakdown voltage inherent for some cryogenic capacitors.
Figure 3:
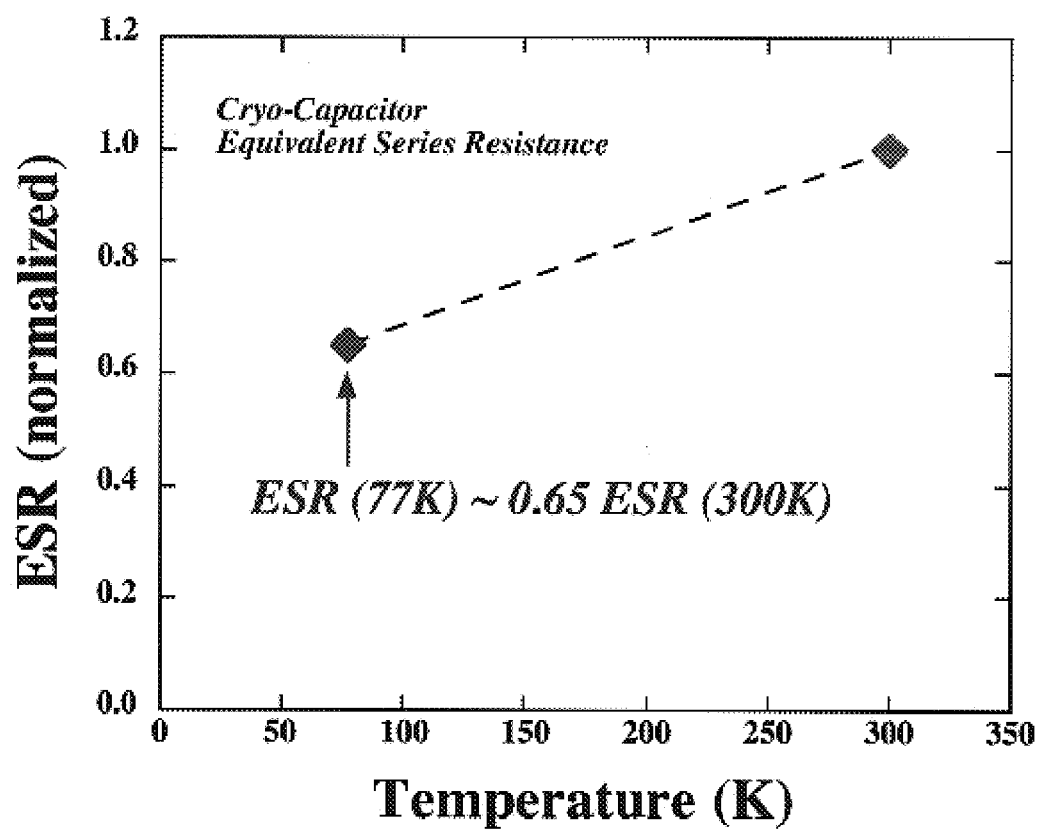
FIG. 3 illustrates the measured improvement in equivalent series resistance (ESR) of an MTECH cry-capacitor. The data has been normalized with respect to 300 K option.
Figure 5:
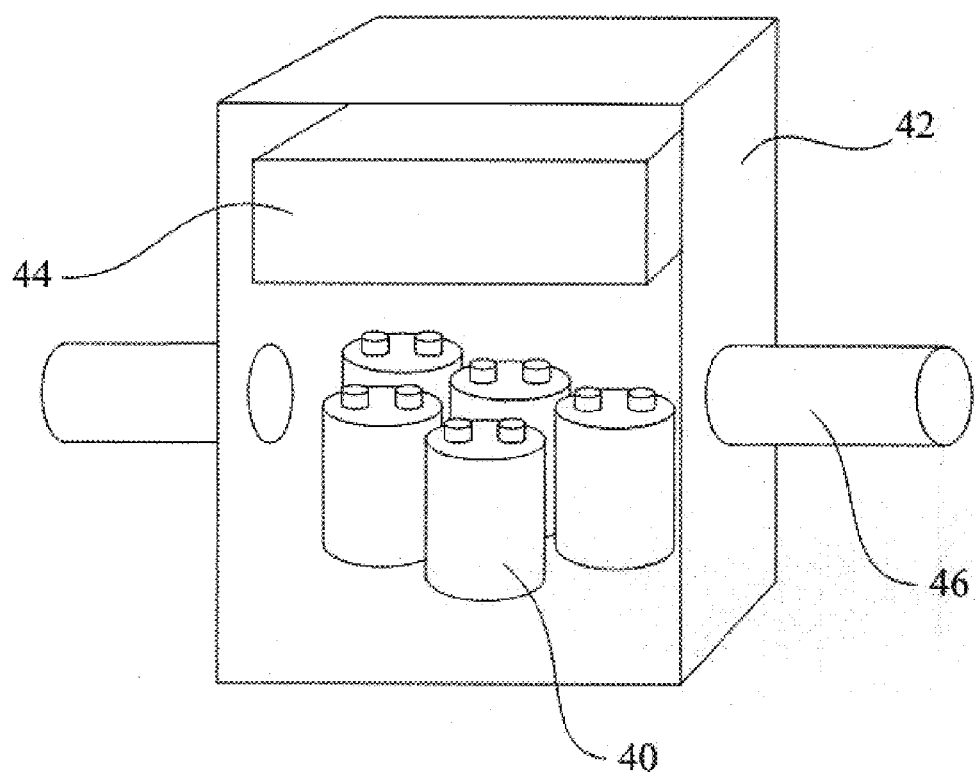
FIG. 5 shows the current state of the art for large capacitor banks, operated at room temperature or above. Capacitors 40 are connected in series and/or in parallel, and must be housed in a container 42. Heat removal equipment 44 may be necessary as well. A power bus 46 carries current to and from the capacitors (the connection between the two is not shown).
Figure 6:
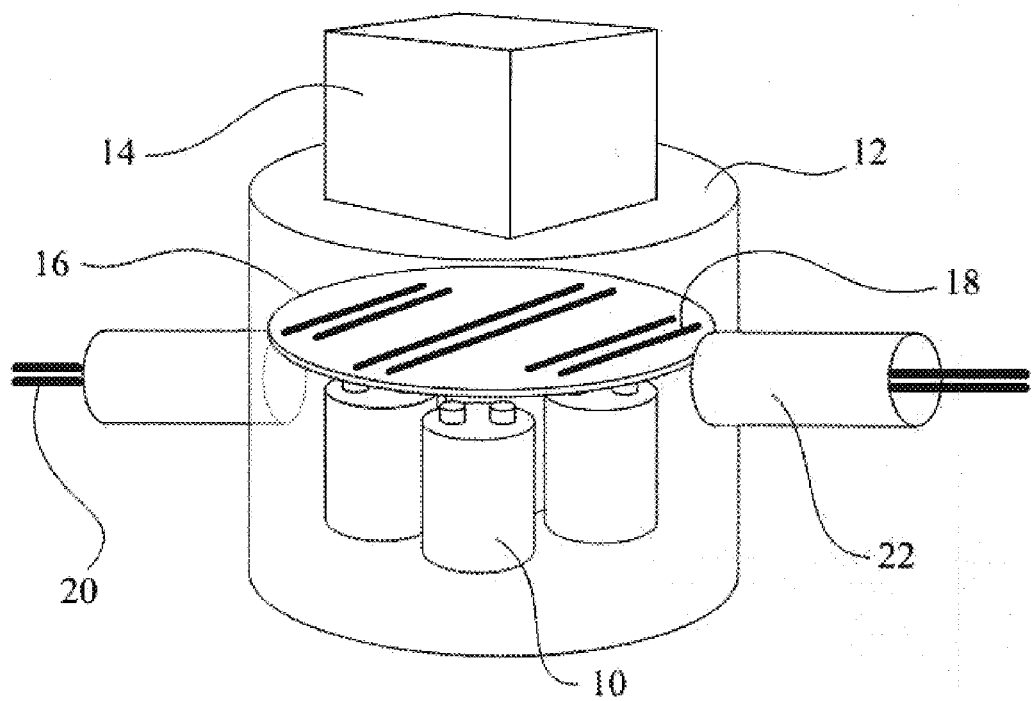
FIG. 6 shows an energy storage bank comprising of cryogenic capacitors, as claimed in this invention. To this systems can be added any number of cryogenically operated devices, including those utilizing superconductors. Not shown arm connections to the power bus and between capacitors.
Figure 7:
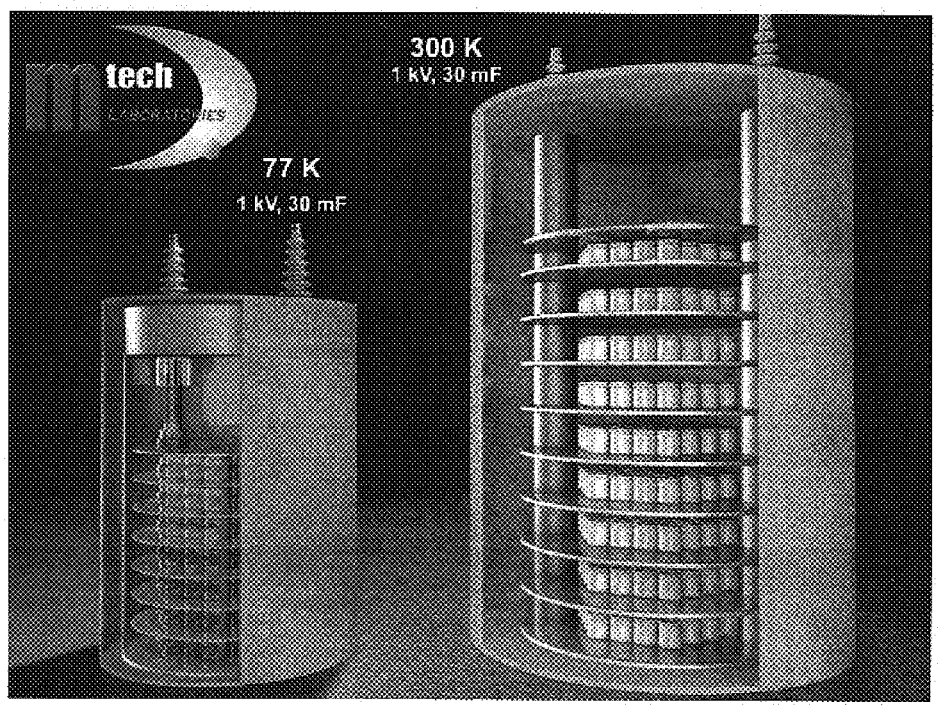
FIG. 7 is an artist's rendition of a complete cryogenic capacitor bank, compared to one intended for room-temperature operation.
Figure 8:
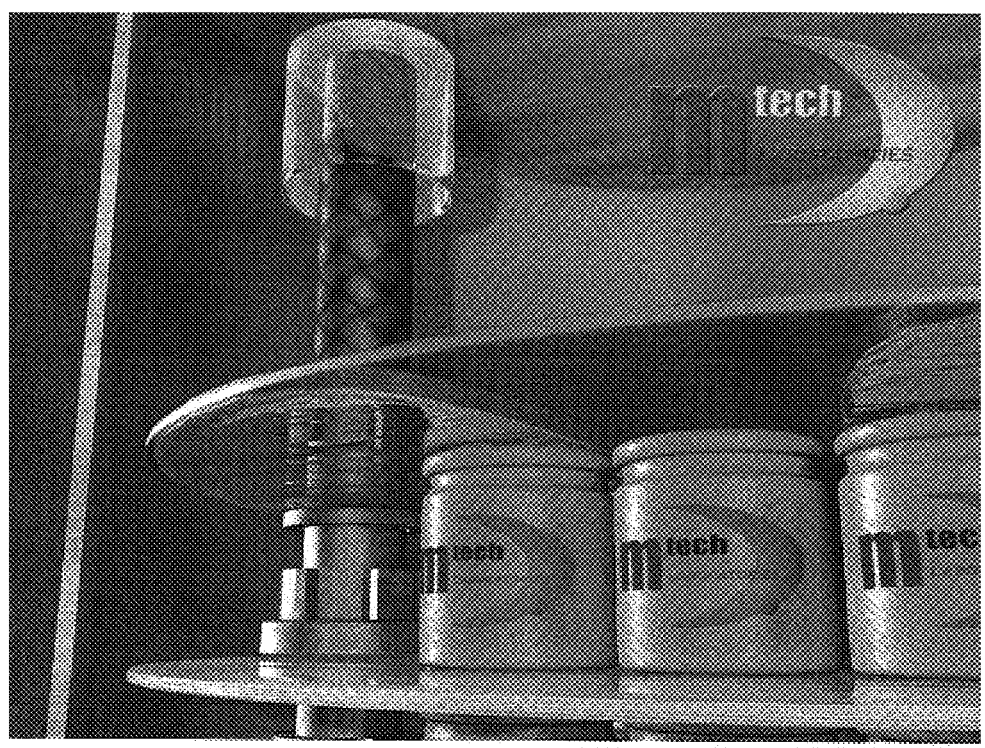
FIG. 8 is an artist's rendition of the inside of a cryogenic capacitor bank, showing the cryogenic capacitors 10 and the large disk 16 used to connect the devices.

Cryogenic capacitors 10 are connected either in series or in parallel, and placed inside a cryogenic container 12 (also known as a Dewar). The refrigeration is provided by a refrigerator 14, which could utilize a cryogenic fluid such as liquid nitrogen, and could be placed on top of the cryogenic container 12 or in any other proximity to it. Connections within this capacitor bank (not shown) could be made using a large disk 16 upon which conducting buses 18 are placed or etched. These conducting runs 18 can also consist of superconducting materials. The cryogenic capacitors 10 and conducting buses 18 on the large disk 16 can be connected to a power bus 20 (connection not shown), made of copper, superconducting cable, or any other current-carrying material. This power bus 20 requires its own cryogenic container 22 which leads to either a power source or other components in the power system. These other components could also be housed inside the same cryogenic container 12 as the cryogenic capacitors 10, thus reducing the current path between these two elements of the system.

REFERENCES

1. C. Belove, ed., Handbook of Modern Electronics and Electrical Engineering, John Wiley & Sons, New York, 1986, p. 141

2. G. Hartwig, Polymer Properties at Room and Cryogenic Temperatures, Plenum Press, New York, 1994, p. 265

The invention claimed is:

1. A system for storing electrical energy, comprising:
an energy storage unit having an electrical input and an electrical output, said energy storage unit including a capacitor with performance characteristics that are enhanced at temperatures below 300K;
a refrigeration unit thermally connected to said capacitor to cool said capacitor to enhance its performance,
wherein one said enhanced performance characteristic of said capacitor is its breakdown voltage, said capacitor being safely operable at a temperature less than 300K at a higher voltage than its rated 300K breakdown voltage.

2. The system for storing electrical energy of claim 1, wherein said capacitor includes one of a polymer film dielectric material chosen from a family of polymer films and a non-polymeric dielectric.

3. The system for storing electrical energy of claim 1, wherein said capacitor performance characteristics that are enhanced at temperatures below 300K ambient are at least one of energy density, equivalent series resistance, dissipation factor, loss tangent, equivalent series inductance, dielectric strength, quality factor, and leakage current.

4. The system for storing electrical energy of claim 1, wherein said temperatures below 300K are maintained using a cryogenic fluid, including at least one of liquids and gases.

5. The system for storing electrical energy of claim 4, wherein said energy storage unit is connected to an electrical circuit by electrical leads, said cryogenic fluid increasing breakdown voltage of said electrical leads connected to said energy storage unit and said electrical circuit, arcing and leaking of electrical current around said electrical leads being substantially reduced.

6. The system for storing electrical energy of claim 5, wherein said electrical circuit contains at least one of a cryogenic rectifier, a cryogenic inverter, a superconducting motor, a cryogenic rectifier, a superconducting quantum interference device, a radio frequency circuit, an antenna tuner, a cryogenic laser, and a cryogenic maser.

7. The system for storing electrical energy of claim 1, wherein said temperatures below 300K ambient are maintained in a vacuum, and wherein said vacuum increases the voltage threshold of electrical leads connected to said energy storage unit and to an electrical circuit, thereby substantially reducing the possibility of arcing and leading of electrical current around said electrical leads.

8. The system for string electrical energy of claim 1, wherein said capacitor in said energy storage unit contains a conductive material having a conductivity that increases at temperatures below ambient.

9. The system for storing electrical energy of claim 1, wherein there is a plurality of said capacitor, said capacitors in said energy storage unit are cooled by said refrigeration unit and contain at least one of plates, terminals, connectors, and interconnection buses made with conductive materials comprising superconducting materials which exhibit practically zero resistances at temperatures below ambient.

10. The system for storing electrical energy of claim 1, wherein said capacitor in said energy storage unit is utilized in at least one of an electrical signal filter, a high frequency resonator, and a low frequency resonator.

11. The system for storing electrical energy of claim 1, wherein said energy storage unit comprises a capacitor bank with plurality of cryogenic capacitors connected in at least one of parallel for increased capacitance and series for higher breakdown voltage.

12. A system as in claim 1, further comprising a container housing said energy storage unit and thermally insulating said energy storage unit from an external ambient.

13. A system as in claim 12, wherein said refrigeration unit cools the interior of said container.

14. A system as in claim 1, wherein said energy storage unit electrical input and electrical output are used for circuit connection to at least one of a power source and an electrical power component.

15. A system as in claim 12, wherein said energy storage unit is at cryogenic temperature and further comprising a connector unit for connecting said input and output to an enclosure having internal conditions different from said container, said different conditions including at least temperature.

16. A method of using a capacitor, comprising the steps of:
a) providing a capacitor, said capacitor having at least one performance characteristic at 300K that is enhanced when said capacitor is operated at a temperature lower than 300K, one said enhanced performance characteristic of said capacitor being its breakdown voltage, said capacitor being safely operable at a temperature less than 300K at a higher voltage than its rated 300K breakdown voltage;
b) providing a refrigeration unit having a heat transfer relationship with said capacitor;
c) operating said refrigeration unit to cool said capacitor below 300K to enhance said at least one characteristic;
d) operating said cooled capacitor in a circuit providing input to and taking output from said capacitor, said circuit benefiting from said at least one enhanced characteristic.

17. A method as in claim 16, wherein said capacitor characteristics include at least one of electric strength that increases, leakage current that decreases, equivalent series resistance that decreases, and loss factor that decreases, as temperate drops below 300K.

18. A method as in claim 16, wherein said performance characteristics that are enhanced at temperatures below ambient include at least one of energy density, equivalent series resistance, dissipation factor, loss tangent, equivalent series inductance, dielectric strength, quality factor, and leakage current.

* * * * *